US009028331B2

(12) United States Patent
Uchiyama et al.

(10) Patent No.: US 9,028,331 B2
(45) Date of Patent: May 12, 2015

(54) GAME SYSTEM, AND GAME APPARATUS AND A STORAGE MEDIUM STORING A GAME PROGRAM FOR SAID GAME APPARATUS

(75) Inventors: Satoshi Uchiyama, Minato-ku (JP); Daisuke Chiba, Minato-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 12 days.

(21) Appl. No.: 13/825,092

(22) PCT Filed: Sep. 20, 2011

(86) PCT No.: PCT/JP2011/071365
§ 371 (c)(1),
(2), (4) Date: Mar. 19, 2013

(87) PCT Pub. No.: WO2012/039391
PCT Pub. Date: Mar. 29, 2012

(65) Prior Publication Data
US 2013/0184073 A1 Jul. 18, 2013

(30) Foreign Application Priority Data
Sep. 21, 2010 (JP) ................................ 2010-211067

(51) Int. Cl.
*A63F 9/24* (2006.01)
*A63F 13/30* (2014.01)
(Continued)

(52) U.S. Cl.
CPC .................. *A63F 13/12* (2013.01); *A63F 13/10* (2013.01); *A63F 13/49* (2014.09); *A63F 13/45* (2014.09); *A63F 13/00* (2013.01); *A63F 13/812* (2014.09); *A63F 2300/609* (2013.01)

(58) Field of Classification Search
CPC ............ G07F 17/3262; G07F 17/3232; G07F 17/3269; A63F 13/12; A63F 13/10
USPC .................................................. 463/29, 40–42
See application file for complete search history.

(56) References Cited

U.S. PATENT DOCUMENTS

| 2004/0092313 A1 | 5/2004 | Saito et al. | |
| 2004/0143852 A1* | 7/2004 | Meyers | ........................ 725/133 |

(Continued)

FOREIGN PATENT DOCUMENTS

| CN | 1625425 A | 6/2005 |
| CN | 1714900 A | 1/2006 |

(Continued)

OTHER PUBLICATIONS

WoWWiki, http://www.wowwiki.com/, Indivdival articles: "Realm",Jun. 6, 2009,http://www.wowwiki.com/Realm?oldid=1910601, "Swift Flight Form Quest Chain", Jul. 23, 2009,http://www.wowwiki.com/Swift_Flight_Form_quest_chain?oldid=1959062, Quest Chain, Aug. 3, 2008,http://www.wowwiki.com/Quest_chain?oldid=1558654.*

(Continued)

*Primary Examiner* — Justin Myhr
(74) *Attorney, Agent, or Firm* — Howard & Howard Attorneys PLLC

(57) ABSTRACT

A game system is provided with a communication mode using communication and a task mode in which a player selects one task from a plurality of tasks (operations), and plays a game with an aim to achieve the task, and operates operation management data 111 so that it is changed by following a predetermined condition whether the status of task is permission or forbiddance. The game system allows the player to select at least one task achieved by the player, and communicates data 112s, 112r in association with the game-play of communication mode between the game apparatuses, the data 112s, 112r being for permitting the selection of task specified by each player. And, the game system operates the operation management data 111 so that the selection of task corresponding to the data 112r received gets permitted.

10 Claims, 8 Drawing Sheets

(51) Int. Cl.
    *A63F 13/40*       (2014.01)
    *A63F 13/49*       (2014.01)
    *A63F 13/00*       (2014.01)
    *A63F 13/45*       (2014.01)
    *A63F 13/812*     (2014.01)

(56) References Cited

U.S. PATENT DOCUMENTS

| | | |
|---|---|---|
| 2006/0003841 A1 | 1/2006 | Kobayashi et al. |
| 2008/0214311 A1 | 9/2008 | Saito et al. |
| 2008/0242427 A1 | 10/2008 | Namba |
| 2009/0082088 A1* | 3/2009 | Anderson et al. ............... 463/20 |
| 2009/0170593 A1* | 7/2009 | Pacey ............................... 463/25 |
| 2010/0240441 A1 | 9/2010 | Goto et al. |
| 2011/0118033 A1* | 5/2011 | Fiedler ............................. 463/42 |
| 2011/0281638 A1* | 11/2011 | Bansi et al. ...................... 463/23 |

FOREIGN PATENT DOCUMENTS

| | | |
|---|---|---|
| CN | 101801481 A | 8/2010 |
| JP | 2001-087545 A | 4/2001 |
| JP | 2001-276422 A | 10/2001 |
| JP | 2005-261762 A | 9/2005 |
| JP | 2006-14952 A | 1/2006 |
| JP | 2009-66323 A | 4/2009 |
| KR | 10-2004-0045375 A | 6/2004 |
| KR | 10-2008-0087643 A | 10/2008 |

OTHER PUBLICATIONS

Japanese Office Action with English Translation (Issued Dec. 6, 2011).
Japanese Office Action with English Translation (Issued Mar. 6, 2012).
International Search Report (Date of Mailing Dec. 13, 2011).
Korean Office Action with English Translation—Issued: May 26, 2014.
Chinese Office Action with English Translation—Issued: Jun. 5, 2014.
Chinese Office Action with English Translation; Issued Feb. 6, 2015.
Korean Patent Rejection Decision with English Translation; Issued on Oct. 23, 2014, but not Received until Feb. 3, 2015.

\* cited by examiner

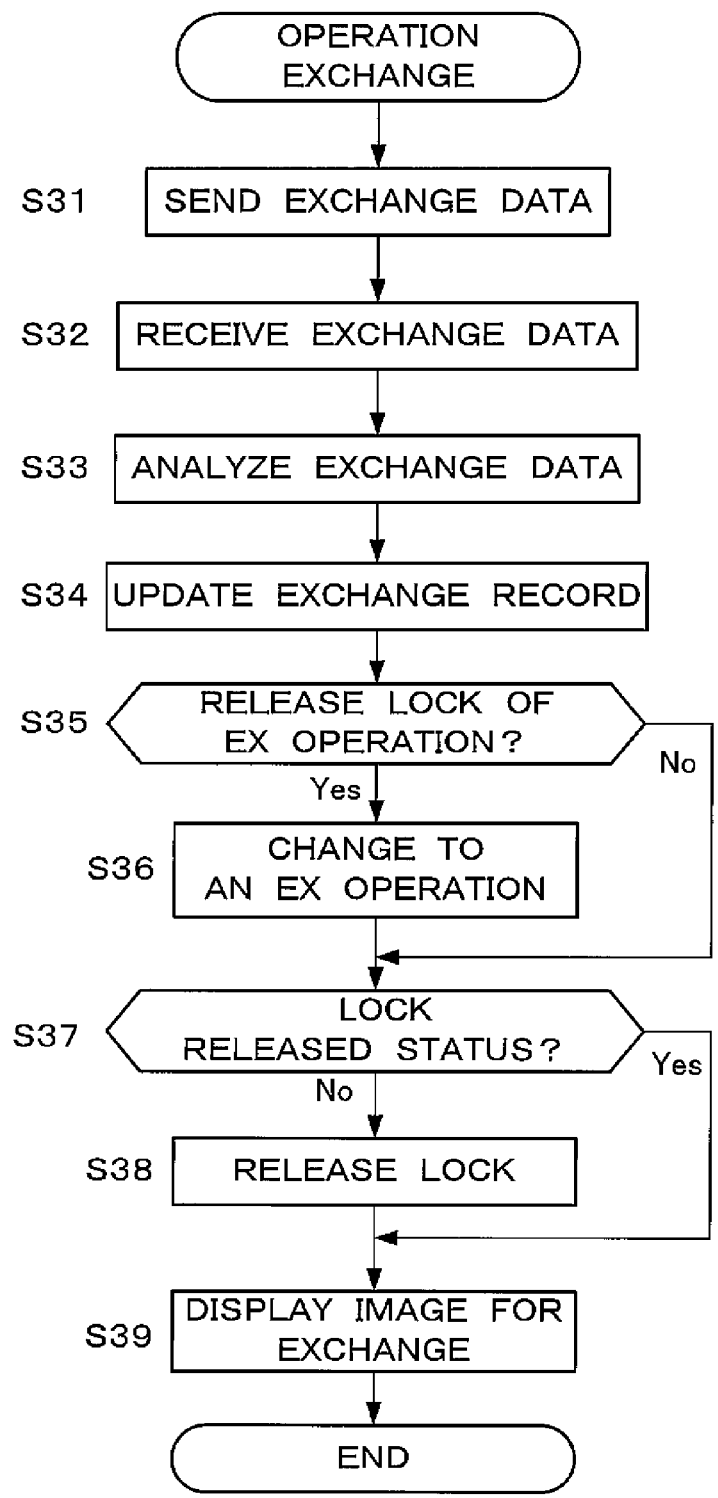

GAME SYSTEM, AND GAME APPARATUS AND A STORAGE MEDIUM STORING A GAME PROGRAM FOR SAID GAME APPARATUS

CROSS REFERENCE TO RELATED APPLICATION

This application is a national stage application of PCT/JP2011/071365, filed Sep. 20, 2011, which claims priority to Japanese Patent Application No. 2010-211067, filed Sep. 21, 2010, the disclosures of which are hereby incorporated by reference in their entirety.

TECHNICAL FIELD

The present invention relates to a game system and the like where prepared are a communication mode which enables a player of each game apparatus to play a predetermined game using communication between plural game machines and a task mode which enables a player of each game apparatus to select one of a plurality of tasks and play a game with an aim of accomplishing the selected task. The present invention relates to a game system in which reference information using a game result is provided, a control method used therein, and a computer program.

BACKGROUND ART

There is known a game system which is configured so as to give a motivation to play a game repeatedly to a player in such a way that, while at least a part of plural tasks prepared for a game, for example, one or plural tasks which has/have a comparatively low difficulty level is/are in a status that it is permitted that the task(s) can be selected by a player, the other tasks are in a status that these tasks are forbidden to be selected, and in a case that a task already selected is accomplished, it is permitted to select at least one task, the selection of which has been forbidden before then (for example, a patent literatures 1 and 2).
Patent Literature: PTL1: JP-A-2001-87545 and PTL2: JP-A-2001-276422.

SUMMARY OF INVENTION

Technical Problem

In a conventional game system where the plural tasks are prepared, the determination whether the tasks should be permitted or forbidden to be selected is controlled by using a status of achievement of tasks as a condition for determination. Accordingly, due to a particular task which a player cannot achieve, a status that the selection of next task is forbidden lasts. Thereby, there is a possibility that an inconvenient situation that a player loses his/her interest in the game occurs. In order to reduce the possibility, it is necessary to heed a setting of condition for switching between permission and forbiddance of task selection at a step where a storage medium storing a game program is developed. However, when there is a limitation that an achievement of a particular task is a condition for releasing selection forbiddance of the other task (that is, the permission of selection), freedom degree of condition setting is low, and this could be one reason why the load of development is increased.

Then, an aim of the present invention is providing a game system and the like which can enhance the freedom degree of condition setting with respect to the switch between permission and forbiddance of task selection, and thereby, can enhance enjoyability of game while suppressing increase of load required for developing the task mode.

Solution to Problem

A game system as one aspect of the present invention is a game system provided with a communication mode enabling, by using communication among a plurality of game machines, a player of each of the plurality of game apparatuses to play a predetermined game and a task mode enabling a player of each of the game apparatuses to select one of a plurality of tasks and play a game with an aim to achieve the task, the game system comprising: a storage device which stores, with respect to at least one part of the tasks, task management data for identifying for each task whether a status of selection by a player is permission or forbiddance; a task management device adapted and configured to operate the task management data so that the status of selection of task changes between permission and forbiddance by following a predetermined condition; a present target specifying device adapted and configured to allow a player of each of the game apparatuses to specify at least one task from tasks achieved by the player himself/herself as a present target; an information sending device adapted and configured to send to a game machine of a partner of the communication mode, necessary information for permitting the selection in the task mode with respect to the task specified as the present target, the necessary information being associated with game-play of the communication mode; and an information receiving device adapted and configured to receive the necessary information, in a case that the necessary information is sent from the game apparatus of the partner, wherein the task management device includes a present task permission device adapted and configured to, in a case that the information receiving device receives the necessary information, operate the task management data so that permitted is the selection of the task as the present target corresponding to the necessary information.

A game apparatus as one aspect of the present invention is a game apparatus being provided with a communication mode enabling a player to play a predetermined game using communication and a task mode enabling a player to select one of a plurality of tasks and play a game with an aim to achieve the task, the game apparatus comprising: a storage device which stores, with respect to at least one part of the tasks, task management data for identifying for each task whether a status of selection by a player is permission or forbiddance; a task management device adapted and configured to operate the task management data so that the status of selection of task changes between permission and forbiddance by following a predetermined condition; a present target specifying device adapted and configured to allow a player to specify at least one task from tasks achieved by the player himself/herself as a present target; an information sending device adapted and configured to send to a game machine of a partner of the communication mode, necessary information for permitting the selection in the task mode with respect to the task specified as the present target, the necessary information being associated with game-play of the communication mode; and an information receiving device adapted and configured to receive the necessary information, in a case that the necessary information is sent from the game apparatus of the partner, wherein the task management device includes a present task permission device adapted and configured to, in a case that the information receiving device receives the necessary information, operate the task management data so that permitted is the selection of the task as the present target corresponding to the necessary information.

A storage medium storing a game program as one aspect of the present invention is a storage medium storing a game program of a game apparatus, the game apparatus being provided with a communication mode enabling a player to play a predetermined game using communication and a task mode enabling a player to select one of a plurality of tasks and play a game with an aim to achieve the task, and comprising a storage device which stores, with respect to at least one part of the tasks, task management data for identifying for each task whether a status of selection by a player is permission or forbiddance, the game program making a computer of the game apparatus function as: a task management device adapted and configured to operate the task management data so that the status of selection of task changes between permission and forbiddance by following a predetermined condition; a present target specifying device adapted and configured to allow a player to specify at least one task from tasks achieved by the player himself/herself as a present target; an information sending device adapted and configured to send to a game machine of a partner of the communication mode, necessary information for permitting the selection in the task mode with respect to the task specified as the present target, the necessary information being associated with game-play of the communication mode; and an information receiving device adapted and configured to receive the necessary information, in a case that the necessary information is sent from the game apparatus of the partner, wherein the game program makes the task management device as a present task permission device adapted and configured to, in a case that the information receiving device receives the necessary information, operate the task management data so that permitted is the selection of the task as the present target corresponding to the necessary information.

According to the present invention, when a player plays the communication mode, the necessary information for permitting the selection of task specified by the player as the present target is sent to the game apparatus of the partner in association with the game-play of the communication mode. In the game apparatus which received the information, by the task management device the task management data is operated so that the selection of the present target is permitted. Accordingly, from the aspect of a player of one game apparatus, even if the selection by the player is forbidden, by playing the communication mode, there is a possibility that the forbiddance of selection of the task is released so that the task can be selected. Which task is a task the selection of which is permitted in association with the game-play of the communication mode depends on player's intention such that which task is specified as the present task by the player of partner of the communication mode. Accordingly, with respect to the condition setting for switching the status of selection of task from forbiddance to permission, it is possible to improve the freedom degree of the development without increasing extremely the load of development, give unpredictability or contingency to the switch of the status of task selection between forbiddance and permission, and thereby improve game's enjoyability. The task which can be specified as the present target is only a task which has been achieved by the player. Therefore, it does not happen that by exchanging the tasks as the present targets easily between players, the tasks the condition of which for releasing forbiddance of the status of selection status are set strictly in nature, the condition for control of switch between permission and forbiddance of selection of the task is eased disorderly. As the release of forbiddance of task selection is associated with the game-play of the communication mode, it is also possible to give the player a motivation for playing the communication mode.

In one embodiment of the present invention, the task management device may have a switch control device adapted and configured to operate the task management data on a condition at least one part of which is that a player achieved one task, so that the status of selection by the player for another task changes from forbiddance to permission. According to this embodiment, while the status of selection of each task is switched between permission and forbiddance depending on the status of achievement of the task by the switch control device, apart from this control, the present task permission device switches the status of selection of the task from forbiddance to permission in association with the game-play of the communication mode. Thereby, it is possible to set the condition for switching the status of selection of task between permission and forbiddance in association with the game-play of the communication mode, separately from a limitation such that the status of selection is determined in association with the status of achievement of the task. Thereby, it is possible to improve the freedom degree of the condition setting while suppressing the increase of load of development.

In one embodiment of the present invention, the plurality of tasks may include tasks belonging to a first task group where the switch control device is capable of switching the status of selection from forbiddance to permission and tasks belonging to a second task group where the switch control device is not capable of switching the status of selection from forbiddance to permission, and the present target specifying device may be adapted and configured to allow the player to specify the task as the present target from the second task group. Thereby, with respect to the second task group, though the selection is forbidden regardless of the status of achievement of a task, if a game is played in the communication mode and the necessary information for permitting the selection is received from the game apparatus of partner, it is possible to release the forbiddance of the selection. Thereby, it is possible to give a player a strong motivation for playing the communication mode.

In one embodiment of the present invention, the task management device may further include a particular task permission device adapted and configured to operate the task management data, so that permitted is the selection of a particular task different from the present task, in a case that the information receiving device receives the necessary information and a particular condition is satisfied. According to this embodiment, in a case that the particular condition is satisfied, with respect to the particular task different from the present task which has been specified by the partner of the communication mode, it is possible to switch the status of selection from forbiddance to permission. Thereby, it is possible to give further unpredictability or contingency to the control of switching the status of selection of task between permission and forbiddance.

In the above mentioned embodiment, the plurality of tasks may include tasks belonging to a first task group where the switch control device is capable of switching the status of selection from forbiddance to permission and tasks belonging to a second task group where the switch control device is not capable of switching the status of selection from forbiddance to permission, and the particular task permission device may be adapted and configured to select the particular task from the second task group, and operate the task management data so that the selection by the player of the particular task is permitted. Thereby, in a case that the necessary information for permitting the selection of present task is sent from the game apparatus of partner in association with the game-play of the communication mode and the particular condition is satisfied, even if the information from the partner is the necessary information with respect to the task belonging to the first task group, the status of selection of task belonging to the second task group can be switched from forbiddance to permission. Accordingly, it is possible to give further unpredictability or contingency to the control of switching the status of selection of task between permission and forbiddance.

In the above mentioned embodiment, the particular condition may be set in association with record of sending of the necessary information. Thereby, in consideration of record that the necessary information for permitting the selection of task was sent to the other player, it is possible to control whether the selection of task belonging to the second task group should be permitted or not. Further, the particular condition may be set so that at least one part of the particular condition is permitted when the number of times of the sending achieves a predetermined number of times. Thereby, in a case that by playing the communication mode, accumulated is the record that the necessary information for permitting the selection of task is sent to the game apparatus of the player of partner, the selection of task belonging to the second task group can be permitted. Thereby, it is possible to give a player a further strong motivation for playing the communication mode.

In one embodiment of the present invention, the information sending deice may send the necessary information to the game apparatus of the partner each time when the game-play of the game of communication mode ends. In this case, each time when the communication mode is played, information is exchanged between the game apparatuses, and the selection of at least one task is permitted. Thereby, it is possible to give certainly a player a motivation for playing the communication mode.

Effects of Invention

As mentioned above, the present invention is configured in such a way that, by communicating information between the game apparatuses in association with the game-play of the communication mode, the status of selection of task specified by the player of partner is switched from forbiddance to permission. Accordingly, with respect to the condition setting for switching the status of selection of task from forbiddance to permission, it is possible to improve a freedom degree of development without extremely increasing the load of development and possible to give unpredictability or contingency to the switch of status of selection of task between permission and forbiddance, and thereby, it is possible to improve enjoyability of game. The task which can be specified as the present target is limited to a task achieved by the player of partner. Therefore, it does not happen that with respect to tasks the condition of which for releasing forbiddance of selection status is set strictly in nature, by exchanging such tasks easily between players as the task of present target, the condition for controlling the switch between permission and forbiddance of the status of selection of task is eased disorderly. As the forbiddance of the status of selection of task is released in association with the game-play of the communication mode, it is also possible to give a motivation for playing the communication mode to a player.

BRIEF DESCRIPTION OF DRAWINGS

FIG. 9 is a flowchart showing an operation exchange routine implemented by the control unit of the game machine.

DESCRIPTION OF EMBODIMENTS

Hereinafter, one embodiment where the preset invention is applied to a game system using a network will be described. In a game which is provided by the game system of the present embodiment, a communication mode and an operation mode are prepared. In the communication mode, players battle with each other in a common game by using communication between a plurality of game machines which are connected with each other via a network. In the operation mode, a player selects and plays operations (tasks) prepared in a game. The game content of each operation is set appropriately in association with a condition for playing the game, situation in progress of game-play, game-play result and the like.

Figure 1:
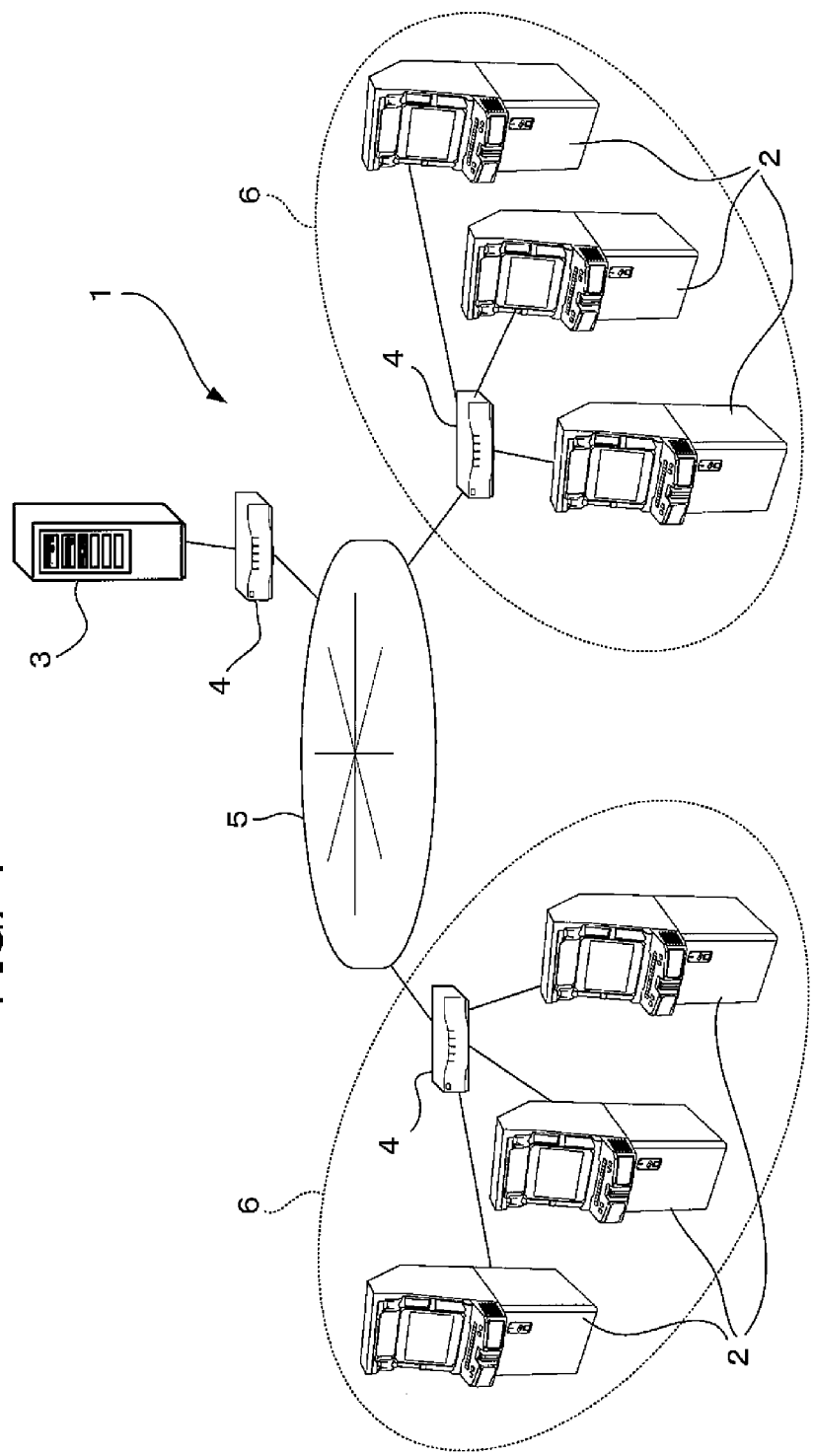
FIG. 1 is a diagram showing a schematic configuration of a game system according to one embodiment of the present invention.

FIG. 1 shows a schematic configuration of the game system according to the present embodiment. In the game system 1, a plurality of game machines (game apparatuses) 2 and a center server 3 are connected to a network 5 via a router 4 respectively. The center server 3 is not limited to an example that is configured by one physical apparatus. One logical center server 3 may be configured by servers as plural physical apparatuses. Alternatively, one of the game machines 2 may be also used as the center server 3. The network 5 realizes a network communication using the TCP/IP protocol, and the Internet is typically used as the network 5. Each game machine 2 is configured as a game machine for business use or commercial use which collects a game-play fee as a counter value of a game. Appropriate pieces of game machines 2 are installed to each commercial facility such as a store 6. The routers 4 are installed so as to be correlated to the stores 6 and the center server 3 respectively. The game machines 3 in the same store are connected to the network 5 via a shared router 4. The game system may be configured in such a way that a local server is installed between the game machine 2 and the store 6, and the game machine 2 is connected communicably to the center server 3 via the local server.

The center server 3 is installed by an administrator of the game system 1, and provides various kinds of services via the network 5 to the game machine 2 or the player of the game machine 2. As one example, the center server 3 provides the following services: a update service of a game program or data via a game machine 2, a service of verifying a player of a game machine 2, storing on the center server 3 player data of the player including game-play history, save data and the like, and in response to a request from a game machine 2, providing the player data to the game machine 2, and a combining service of players necessary for progressing a game where the game players battle or cooperate with each other via the network 5.

Each of the game machines 2 and the center server 3 is provided with a unique IP address for identifying them on the network 5. In the communication between the game machines 2 or between the game machine 2 and the center server 2, a communication partner is specified by using the IP address. When the network 5 is a network having openness like the internet, each of the routers 4 is provided with a static address unique on the network 5. To each game machine 2, set as the IP address is a private address to be combined with the static address for identifying uniquely the game machine 2 on the network 5. In this case, a virtual private network (VPN) is configured between the game machine 2 and the center server 3, or between the game machines 2, and each game machine 2 is specified uniquely by using the private address on the VPN.

Figure 2:
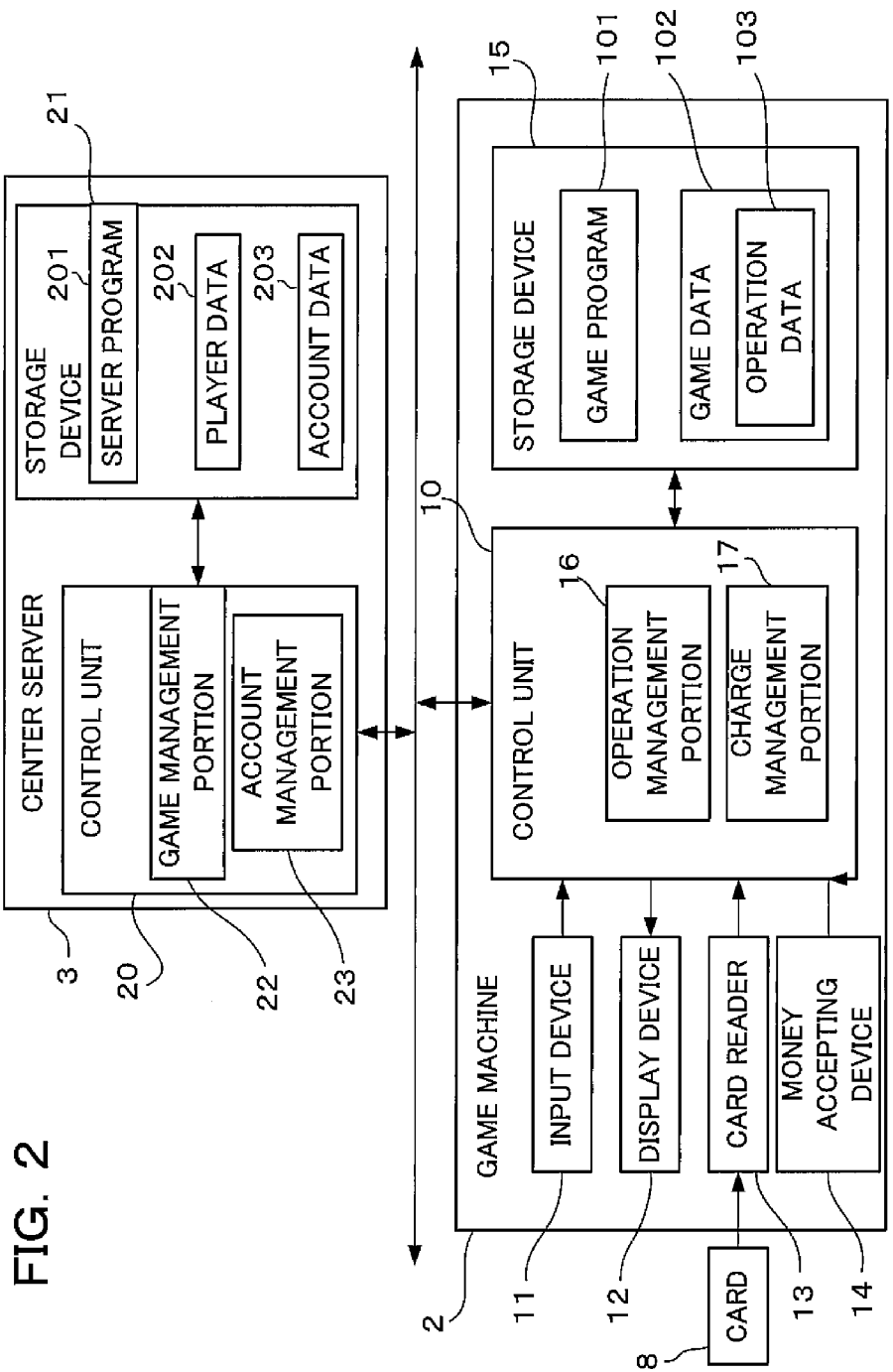
FIG. 2 is a functional block diagram of a control system of a game machine and a server shown in FIG. 1.

Next, in reference to FIG. 2, the configuration of control system of the game system 1 will be described. The game machine 2 is provided with a control unit 10. To the control unit 10, an input device 11, a display device 12, a card reader 13, a money acceptance device 14, and a storage device 15 are connected. The input device 11 accepts operations of a player and outputs signals in response to the contents of the operations to the control unit 10. The display device 12 displays a game image and the like by following instructions from the control unit 10. The card reader 13 reads out information from a card 8 possessed by a player and outputs a signal corresponding to the information to the control unit 10. The card 8 is provided with a non-volatility storage medium (not illustrated) such as an IC chip and magnetic stripe. Recorded in the storage medium are an ID unique for each card 8 (hereinafter, sometimes referred to as a card ID) and the like. The card ID may be recorded on the card 8 in a state of bar code. The money acceptance device 14 detects a value of money (coins or paper notes) inputted by a player, and outputs a signal according to the value inputted to the control unit 10. The storage device 15 stores a game program 101 for making the control unit 10 execute a predetermined game, and various kinds of data such as the game data 102 which the game program 101 refers to as appropriate for progressing the game. In the game data 102 the operation data 103 is included. The operation data 103 is data where a content of each of a lot of operations (tasks) prepared for the game is described.

The control unit 10 reads and executes the game program 101 of the storage device 15. Thereby, various kinds of logical devices are generated inside the control unit 10. In FIG. 2, as a part of such logical devices, an operation management portion 16 and a charge management portion 17 are shown. The operation management portion 16 executes various kinds of processing relating to execution or progress of the operation mode such as selection of operation and execution of operation by a player, referring to the operation data 103. The charge management portion 17 executes processing relating to collection of the game-play fee such as requirement for paying the game-play fee to the player and determination whether the value of game-play fee required has been collected or not. In the present embodiment, as a means (a method) that a player pays the game-play fee, provided on a selectable manner are a method of paying by cash using the money acceptance device 14 and a method of paying by withdrawing electronic money from his/her account managed by the center server 3. The minimum unit of payment value (the minimum value) of the method by electronic money is smaller than the minimum unit of the method by cash. For example, while 100 JPY is the minimum unit in a case of paying by cash, it is possible to pay electronic money the value of which is one JPY unit.

The center server 3 is provided with a control unit 20 and a storage device 21. The control unit 20 is a computer unit comprising a microprocessor and an internal storage device (not illustrated) providing a ROM, a RAM and the like. In the ROM, recorded is a game program to be executed by the microprocessor such as an operating system and the like. The RAM provides a work area to the microprocessor. Although to the control unit 20, an input device such as a keyboard or the like, and an output device such as a monitor or the like are connected, the illustrations of them are omitted. The storage device 21 stores a server program 201 to be executed by the control unit 20 and various kinds of data to be referred to by the server program 201. In FIG. 2, as a kind of data to be referred to by the control unit 20, player data 202 and account data 203 are shown.

The player data 202 is a set of records, in each of which attributes of a player (his/her name, age, sex and the like) and information relating to game-play content such as a game-play history and scores are recorded in association with the card ID of the card 8 possessed by the player. The account data 203 is a set of records in each of which the value of electronic money possessed by a player is recorded in association with an ID unique for the player (hereinafter, referred to as a player ID). The card ID and the player ID are correlated to each other on one to one, or many to one. In the storage device 21 of the center server 3, also recorded is data for discriminating a correlation between the card ID and the player ID. It is allowed for a player to increase the value of electronic money held in the account data 203 (deposit) via a website and the like, the website being operated by the administrator and the like of the system 1. The charge to the player corresponding to the deposit of electronic money is executed separately, for example, via a settlement means using a credit card and the like. Alternatively, the electronic money may be deposited in exchange of cash by using a terminal intended for deposit and the like of the electronic money. The deposit of electronic money to the account data 203 and the settlement thereof are the same as a case in the electronic money system, and the details thereof are omitted. The function relating to collecting a fee using the electronic money may be realized by a device physically separated from the center server 3.

The control unit 20 reads and executes the server program 2-1 of the storage device 21. Thereby, a plurality of logical devices are provided inside of the control unit 20. In FIG. 2, as a part of such logical devices, a game management portion 22 and an account management portion 23 are provided. The game management portion 22 executes processing necessary for providing a player with a predetermined game via the network 5, such as a processing of combining players of game machines 2 and notifying the game machines 2 of the result of the combination and a processing of transmitting the player data 202 to a game machine 2 and updating the player data 202 based on information transmitted from the game machine 2. The account management portion 23 is in charge of processing relating to management of electronic money such as processing of withdrawing a specified value of electronic money from a record (corresponding to a player ID) of the account data 203, in response to a withdrawal request of game-play fee from a game machine 2. Namely, in a case the withdrawal processing is requested from a game machine 2 together with a card ID and a payment value, the account management portion 23 specifies a player ID record corresponding to the card ID from the account data 203, and completes the payment of game-play fee by electronic money by subtracting the payment value from the value held in the record specified.

Next, in reference to FIGS. 3 to 5, the operation mode of the game executed in the game machine 2 will be described. First, on the premise of explanation, any game may be executed in the game system 1 as appropriate, in this explanation, it is assumed that a game the theme of which is baseball (hereinafter, referred to as a baseball game) is executed. The baseball game is configured, for example, in such a way that: a player selects a team, and indicates a baseball manager, baseball players, batting order and defense arrangement; after starting the baseball game, while the player directs as the baseball manager, the game is progressed for an aim of defeating the opponent.

Figure 3:
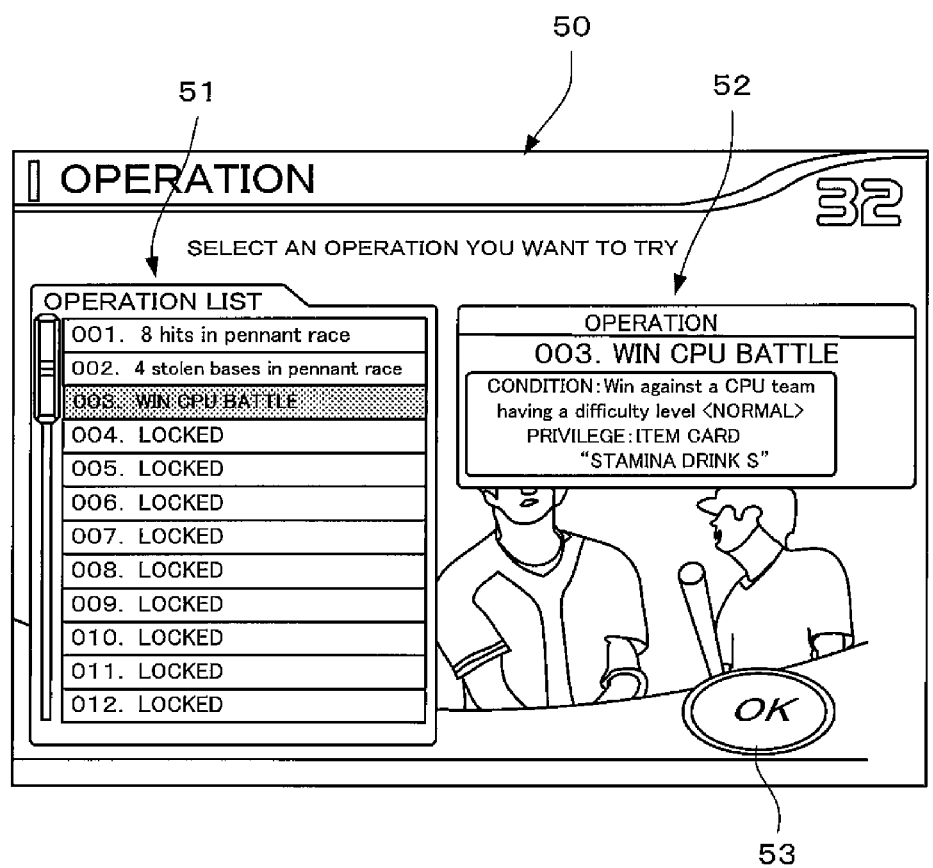
FIG. 3 is a diagram showing one example of game image to be displayed when an operation mode is selected.

FIG. 3 shows an example of game image displayed when the operation mode is selected in the baseball game. The game image 50 shown in FIG. 3 is an image to be displayed the player self selects an operation. The game image 50 is provided with a list display portion 51 and an explanation portion 52. In the list display portion 51, a lot of operations prepared in the game are displayed in a list form. A unique operation number (hereinafter, sometimes referred to as the OP number) is assigned to each of the operations. In the list display portion 51, the operations are aligned from the upward to the downward according to the OP number. In a case that the operation mode is played for the first time, provided are a state that three operations having the OP number 1 to 3 are permitted to be selected and the other operations are forbidden to be selected. For each operation permitted to be selected, a text indicating an abstract of the content of the operation is displayed next to the OP number. On the other hand, for each operation forbidden to be selected, the term "LOCKED" is displayed next to the OP number.

The player can specify any one of the operations from the list display portion 51 as a selection candidate by operating the input device 11 of the game machine 2. The operation specified as the selection candidate is displayed discriminably in a state different from a state of the other operations, for example, displayed in a highlighted state. In FIG. 3, displayed is the state that the OP number "003" is specified as the selection candidate. In the explanation portion 52, displayed is the explanation with respect to the content of the operation being specified as the selection candidate. When the player performs a click operation to a determination button 53 shown in the game image 50 via the input device 11, the operation as the selection candidate is selected at the moment. However, in a state that the operation forbidden to be selected is specified as the selection candidate, the player can't perform the click operation to the determination button 53. When the operation is selected, the content of the operation is read out from the operation data 103, and game-play of the operation mode is started. The game-play of operation is charged. The payment of fee is performed by withdrawal of electronic money from the account data 203. Thereby, in comparison with a case of the settlement by cash using the money acceptance device 14, it is possible to charge smaller fee for the game-play of the operation. Further, it is possible to set precisely each fee depending on the content of each operation.

The content of each operation to be displayed in the list display portion 51 is recorded in the above mentioned operation data 103. Each operation is distinguished as either a normal operation or an EX operation. The forbiddance and permission of selection with respect to the normal operation is controlled so as to be switched depending on the achievement state of the operation. For example, on the condition that one operation is achieved, the status of another operation is switched from forbiddance of being selected to permission of being selected. Typically, relation between the operations is set depending on a difficulty degree. For example, when an operation having a low difficulty degree is achieved, the selection of an operation having a next difficulty degree is permitted. Accordingly, each player can achieve all of the normal operations for himself/herself. However, by playing the communication mode, the selection status of a particular operation could be switched from forbiddance to permission.

While, the EX operation is an operation that the selection status thereof is not switched from the forbiddance to the permission, as long as the communication mode is not played. Even if the game is played repeatedly only in a standalone state, the player can achieve all of the normal operations. On the other hand, the EX operation is prepared as a special operation such that the forbiddance of selection thereof is not released as long as the game is played in a standalone state, and thereby the player cannot achieve the EX operation.

The switch from forbiddance to permission of the selection status of an operation by the game-play of the communication mode is presented to each player as a conception "exchange" of operation. FIGS. 4 and 5 show an example of game image at the moment of exchange of operation. The exchange of operation is executed generally in accordance with the following procedures. First, at the step prior to the battle game using communication, each player specifies an operation to be provided to a player of partner, and sets a comment to be sent to the player of partner. The operations which can be specified are limited to the ones the player self has already achieved. After that, the players play the game of the communication mode. When the game of the communication mode ends, the exchange of operations is started automatically. Here, information for identifying the operation and comment specified by each player is exchanged between the game machines 2. Then, based on the information received from the game machine of partner, while the selection status of particular operation is switched from forbiddance to permission, the comment sent from the player of partner is displayed. The action that one player provides the other player with an operation is represented as a conception "present" of operation in the game.

Figure 4:
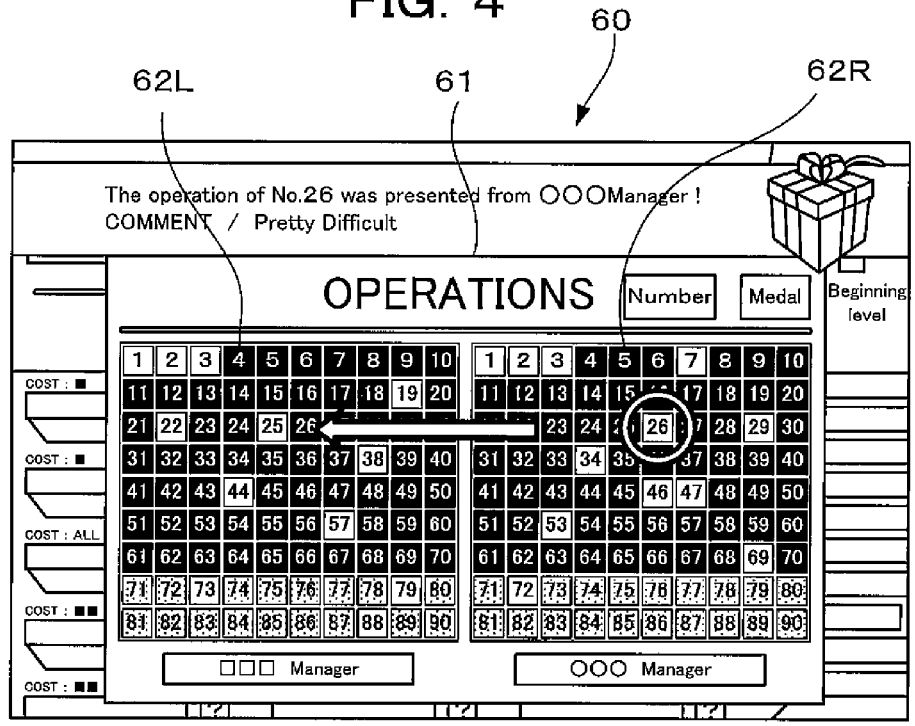
FIG. 4 is a diagram showing one example of game image to be displayed at the moment of exchanging operations.
Figure 5:
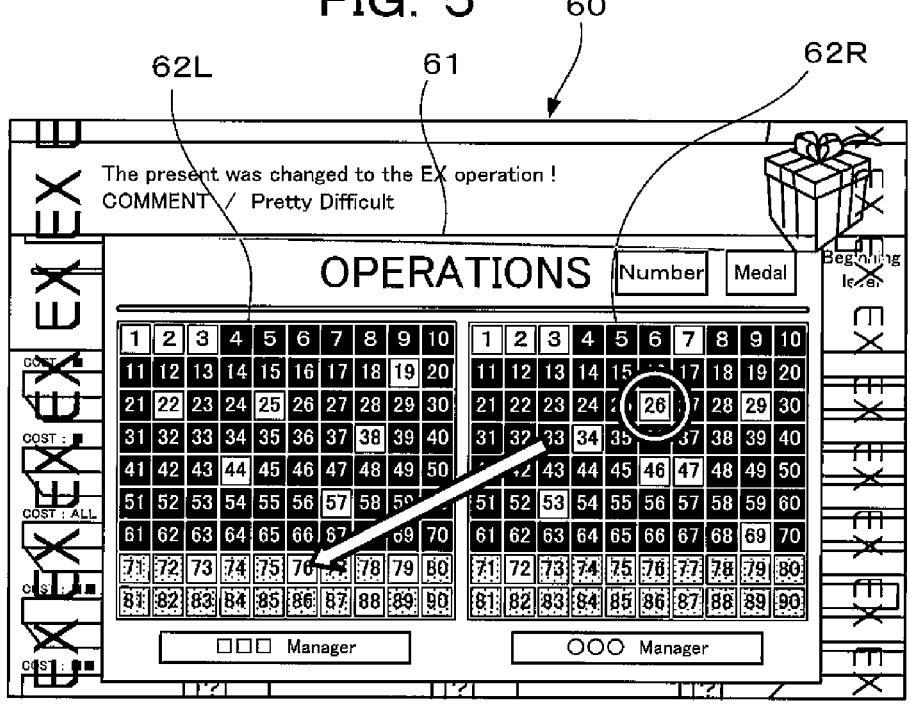
FIG. 5 is a diagram showing one example of game image to be displayed at the moment when an operation presented changes to an EX-operation.

FIG. 4 shows an example of game image at the moment when the selection status of operation is switched from forbiddance to permission based on the information the game machine 2 received from the player of partner. In the game image 60, an exchange status display portion 61 is displayed. The exchange status display portion 61 is provided with a pair of right and left number display portions 62R, 62L. In the left number display portion 62L, displayed is the selection status indicating permission or forbiddance with respect to each operation of the player self. In the right number display portion 62R, displayed is the selection status indicating permission or forbiddance with respect to each operation of the player of partner. In each of the number display portions 62L, 62R, the numbers of all operations are displayed in numerical order from upper left toward lower right. The number of the operation the selection of which is permitted and the number of the operation the selection of which is forbidden are different from each other in a displayed state. For example, the OP number the selection of which is permitted is displayed in a highlighted state, the OP number the selection of which is forbidden is displayed in a dark reversed state. In the number display portion 62R in FIG. 4, the OP numbers 1 to 3, 7, 26 and 29 . . . are permitted to be selected. The OP numbers 1 to 70 are the normal operations and the OP numbers 71 to 90 are the EX operations. Therefore, the area for the OP numbers 71 to 90 is displayed in a state so as to be distinguishable from the area from the OP numbers 1 to 70 (for example, they are displayed in different colors from each other). Additionally, in the lower portion of each of the number display portions 62L, 62R, the name of team's coach is displayed.

When the exchange of operations is executed after the game of communication mode ends, in the exchange status display portion 61, displayed is a state that the operation specified by the player of partner is presented to the player self. In the example shown in FIG. 4, the state that the operation of the OP number 26 is presented from the player of partner to the player self is displayed with using an illustration symbol such as an arrow. At the moment, in the upper side of the game image 60, displayed are a message announcing that the operation of OP number 26 is presented from the coach of partner team and a comment set by the player of partner for the exchange of operations (in the example illustrated, "pretty difficult"). By such displays, each player can recognize the OP number the operation of which is presented from the player of partner. In the example shown in FIG. 4, in the number display portion 62L, that is, to the player self of the game machine 2, the selection of the operation of OP number 26 is forbidden. With respect to the operation of OP number 26 the selection of which is forbidden, the selection status is switched from forbiddance to permission.

As mentioned above, it is a basic matter of the exchange of operations that the selection status of the player self is switched from forbiddance to permission with respect to the operation the number of which was specified by the player of partner. However, in a case that a predetermined condition is satisfied, in place of the operation the number of which was specified by the player of partner, the selection status of any one of the EX operations could be switched from forbiddance to permission. FIG. 5 shows an example of game image 60 to be displayed in a case that the selection of EX operation is permitted. In this example, displayed is the following state: although the operation of OP number 26 is presented from the player of partner, the OP number 26 is changed to the OP number 76; thereby, the selection status of EX operation of OP number 76 is switched from forbiddance to permission.

Figure 6:
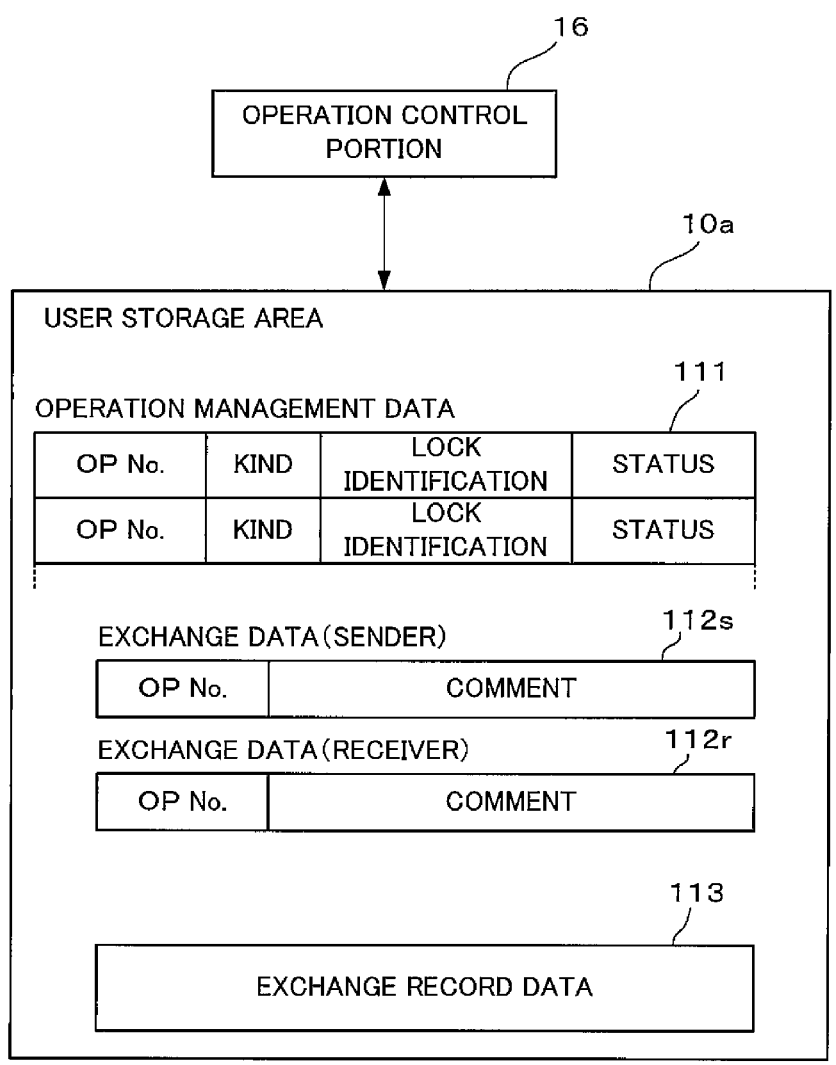
FIG. 6 is a diagram showing a relation between an operation management portion provided in a control unit of a game machine and various kinds of data stored in a user storage area of the control unit for realizing the exchange of operations.

Next, there will be described processing executed by the game machine 2 for managing to switch the selection status of operation between forbiddance and permission. FIG. 6 shows a relation between the operation management portion 16 provided to the control unit 10 of the game machine 2 and various kinds of data held in the user storage area 10a of the control unit 10 for realizing the exchange of operations. The user storage area 10a is one work area which is provided in the inner storage device of the control unit 10. In the example of FIG. 6, as data to be referred to by the operation management portion 16 at the moment of exchange of operations, recorded are operation management data 111, exchange data 112s, 112r, and exchange record data 113.

The operation management data 111 is a set of records, each of which is provided for each operation for managing each operation. One record is correlated to one OP number. The following items are included in one record: the OP number; kind information for distinguishing the kind of operation, that is, whether the operation is the normal operation or the EX operation; lock identification information for determining whether the operation is locked or not, that is, whether the selection of the operation is forbidden or permitted; and status information for determining the status (achievement status) of the operation.

The exchange data 112s is data to be sent to the game machine 2 of the player of partner, and the exchange data 112r is data received from the game machine 2 of the player of partner. Included in the exchange data 112s, 112r are the OP number specifying the operation and the comment. The exchange data 112s of sender is generated at the moment when the comment is set and held in the user storage area 10a. The OP number of the exchange data 112s is the number of the operation specified by the player self as the present for the player of partner. The comment of the exchange data 112s is text data set by the player self as a message to be sent to the player of partner. The exchange data 112r of receiver is received from the game machine 2 of the player of partner and written into the user storage area 10a. The OP number of the exchange data 112r the number of the operation specified by the player of partner as the present for the player self. The comment of the exchange data 112r is text data set by the player of partner as a message to be sent to the player self.

The exchange record data 113 is data which is updated each time when after the communication mode is played the operations are exchanged. The exchange record data 113 is referred in order to determine whether or not the selection of the EX operation, instead of the operation presented from the player of partner, should be permitted. Information which should be recorded in the exchange record data may include as appropriate various kinds of information necessary for determining the past record that the player self exchanged operations in the past, such as the number of times and the frequency that the player self exchanged operations, the number and kind of the operation presented to the player of partner, and the like. In addition, at least the operation management data 111 and the exchange record data 113 within the data 111, 112s, 112r, 113 stored in the user storage area 10a are correlated to the card ID and stored in the storage device 21 of the center server 3 as one part of the player data 202, when the player ends the game of the game machine 2. When the player of the same card ID comes to the store 6 to play the game again, the data 111, 113 stored are read into the game machine 2 and stored in the user storage area 10a by following the player's instruction.

Figure 7:
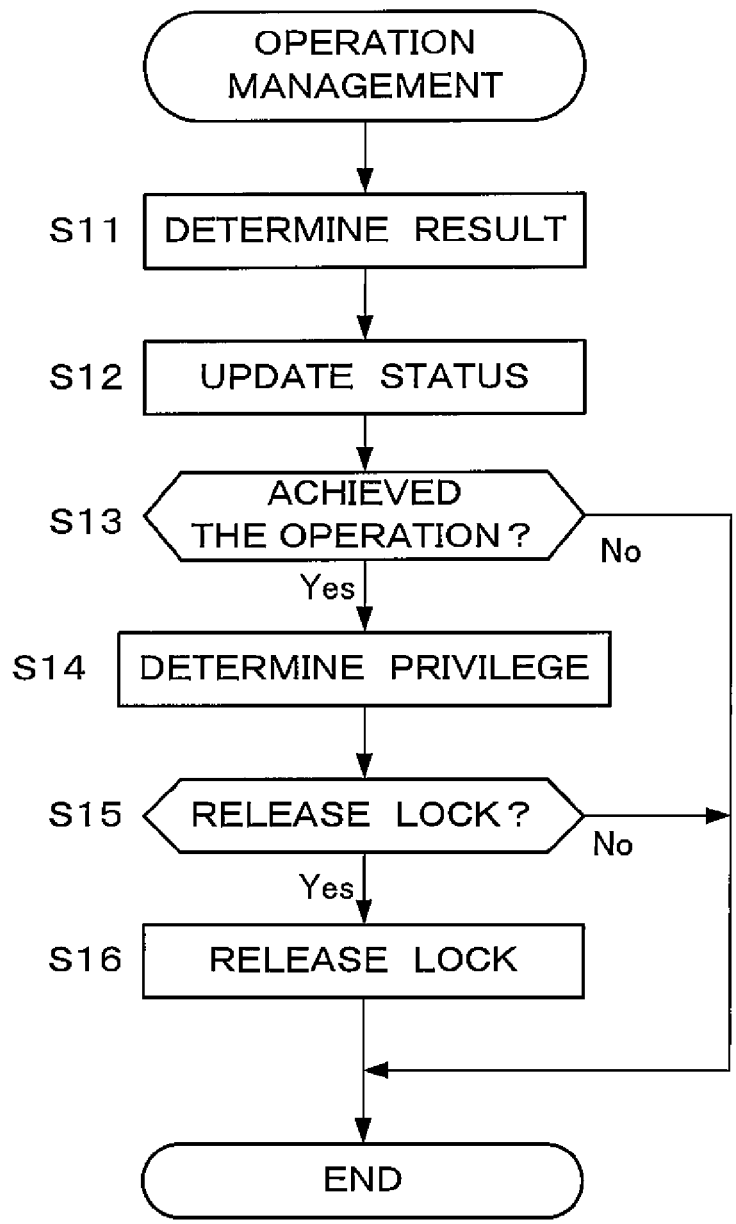
FIG. 7 is a flowchart showing an operation management routine implemented by the control unit of the game machine.
Figure 8:
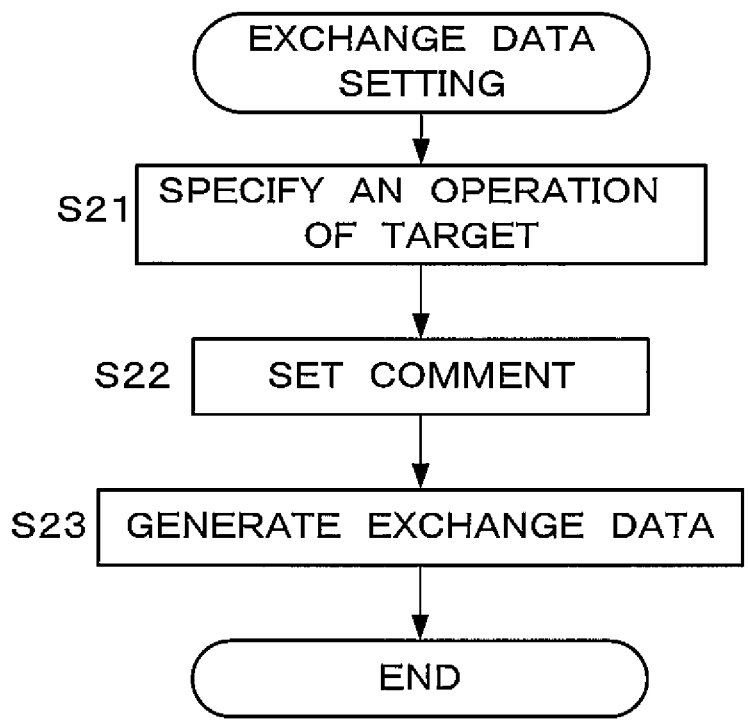
FIG. 8 is a flowchart showing an exchange data setting routine implemented by the control unit of the game machine.

Next, referring to FIG. 7 to 9, described are procedures of processes the control unit 10 executes using the operation management portion 16, in relation to control of determination whether the selection status of operation is permission or forbiddance. FIG. 7 shows an operation management routine the control unit 10 executes using the operation management portion 16 at the moment when a player plays the game of the operation mode and ends playing the game. When starting the operation management routine, the control unit 10, first, determines a result of the operation mode of this time at step S11. In this case, the result is determined by determining whether or not a condition specified in the operation is satisfied. In a case that the condition is not satisfied, the result is determined as "failure". In a case that the condition is satisfied, the result is determined as "achievement". Further, there is also an operation the condition of which is specified over plural games (in this case, one baseball game is one game). In a case of such operation, when the result of game of this time is not determined as "failure" and the game of this time is not a final game, the result of the operation is determined as "continuing".

At step S12, the control unit 10 updates the status information of the operation management data 111 depending on the determination result of step S11. Namely, the control unit 10 writes information corresponding to the determination result, which is any one of "failure", "achievement" or "continuing", into the status information of the record corresponding to the OP number of the operation which was played this time. At subsequent step S13, the control unit 10 determines whether or not the determination result of the operation of this time is "achievement". In a case of "achievement", the control unit 10 goes to step S14 to determine a privilege which should be given for the player to the achievement of the game. As one privilege, prepared is lock release for switching the selection status of the other operation (limited to the normal operation) from forbiddance to permission. Another privilege may be prepared such that given is a symbol (for example, a medal) certificating the achievement of the operation.

As the privilege to be given to the achievement of operation, a privilege may be set fixedly in advance for each operation, or one privilege or more may be selected randomly from plural privilege candidates. In a case that a privilege is set fixedly for each operation, at step S14, a privilege corresponding to the operation of this time may be merely determined. On the other hand, in a case of selecting a privilege, at step S14, it is necessary to select a privilege to be given. Further, in a case of selecting a privilege, the following configuration may be applied: operations are grouped into plural groups depending on the difficulty degree thereof; a plurality of privilege candidates are set in advance for each group; one privilege or more may be selected from the plurality of privilege candidates corresponding to the group which the operation achieved belongs to. The privilege may be given only when an operation which has not been achieved has been achieved, or a return privilege may be given in a case an operation already achieved has been achieved again. The return privilege may be different from a privilege which was given the last time or before.

After determining the privilege, the control unit 10 goes to step S15 to determine whether or not the privilege corresponding to the achievement of operation includes the lock release. In a case that the lock release is included, the control unit 10 goes to step S16 to determine the operation to which the lock release should be performed, that is, determine the OP number of the operation the selection status of which should be switched from forbiddance to permission, and rewrite the lock identification information so as to be changed from forbiddance to permission, the lock identification information being included in the record of the operation management data 111 correlated to the OP number determined. After completing the process of step S16, the control unit 10 ends the operation management routine of this time. In a case that the privilege does not include the lock release at step S15, the control unit 10 skips step S16 and ends the routine of this time. In addition, in a case the privilege determined at step S14 includes another privilege except for the lock release, the control unit 10 executes the processing corresponding to the privilege. However, the illustration of this is omitted.

Next, referring to FIGS. 8 and 9, described are the procedures of processes the control unit 10 executes by using the operation management portion 16 for the exchange of operations.

FIG. 8 shows an exchange data setting routine the control unit 10 executes for setting the exchange data 112s of sender. When the communication is selected and combination of players is completed, the control unit 10 starts the processing shown in FIG. 8. First, at step S21, the control unit 10 allows the player self to specify a present target, that is, an operation to be presented for the player of partner. The operation available to be specified is limited to an operation the player self has already achieved. At least if the operation has been achieved, it is possible to specify the EX operation besides the normal operations. At subsequent step S22, the control unit 10 allows the player self to set his/her comment. The setting the comment may be realized by allowing the player self to input arbitrary letters through a letter input device like a keyboard, for example, or by allowing the player self to select one of plural comments prepared in advance.

After completing the comment setting, the control unit 10 goes to step S23 to generate the exchange data 112s using the number of the operation selected at step S21, and the comment set at step S22, and store the exchange data 112s in the user storage area 10a. With that, the control unit 10 ends the exchange data setting routine. After the routine of FIG. 8 is completed, the game of the communication mode is started. The game of communication mode can be progressed in a similar way to conventional baseball games, and the detail explanation thereof is omitted.

When the game of communication mode ends, the control unit 10 executes various kinds of processes required when the communication mode ends. As one of those processes, the control unit 10 executes an operation exchange routine shown in FIG. 9. Namely, each time when the battle game of the communication mode ends, the control unit 10 executes the operation exchange routine of FIG. 9. When starting the operation exchange routine, the control unit 10, first at step S31, reads the exchange data 112s from the user storage area 10a and sends the exchange data 112s to the game machine 2 of the player of partner. At subsequent step S32, the control unit 10 receives the exchange data 112r which has been sent from the game machine 2 of the player of partner and stores the exchange data 112r in the user storage area 10a.

When receiving the exchange data 112r, the control unit 10 goes to step S33 to analyze the exchange data 112r received and obtain the OP number and the comment. At subsequent step S34, the control unit 10 updates the exchange record data 113 so that the operation exchange of this time is reflected thereon. At subsequent step S35, the control unit 10 determines whether or not the condition for making the lock release of the EX operation (permission of selection) occur is satisfied, referring to the exchange record data 113 updated. As one example, the condition is set so that at least a part thereof is satisfied when the number of times operations were exchanged reaches a predetermined value.

In a case that the condition for the lock release is satisfied at step S35, the control unit 10 goes to step S36 to change the OP number recorded in the exchange data 112r to the OP number of any one of EX operations. The OP number obtained after the change may be determined within the OP numbers of all EX operations, or may be determined within the OP numbers of EX operations the selection of which are forbidden to the player self. After changing the OP number, the control unit 10 goes to step S37. In a case that the condition for the lock release is not satisfied at step S35, the control unit 10 skips step S36 and goes to step S37. In addition, in a case that the OP number of EX operation is set in the exchange data 112r received at step S32, the control unit 10 may set a negative determination at step S35 and goes to step S37.

At step S37, referring to the operation management data 111, the control unit 10 determines whether or not the operation the OP number of which is recorded in the exchange data 112r is in lock released status, that is, whether or not the selection of the operation by the player self has been already permitted. In a case that the operation is not in lock released status, the control unit 10 goes to step S38 to update the lock identification information of the operation management data 111 so that the selection of the OP number recorded in the exchange data 112r is permitted. After that, the control unit 10 goes to step S39. At step S37, in a case that the operation corresponding to the OP number is in the lock released status, the control unit 10 skips step S38 and goes to step S39. At step S39, the control unit 10 displays the game image 60 (FIG. 4 or FIG. 5) for the operation exchange. With that, the control unit 10 ends the operation exchange routine of this time.

According to the game system 1 explained above, with respect to the change from forbiddance to permission of selection status of operation, in addition to a case that the change is realized as a privilege of achievement of a normal operation, the change could be realized by the operation exchange with the player of partner of the communication mode. It depends on the player's will to specify an operation to be presented to the player of partner. Accordingly, with respect to setting the condition for switching the selection status of operation from forbiddance to permission, it is possible to enhance the freedom degree of game development without extremely increasing the load of game development, and possible to give unpredictability or contingency to the switch of the selection status of the operation from forbiddance to permission. Thereby, it is possible to enhance the game enjoymentability. The operation available to be presented to the player of partner is limited to an operation which the player self achieved. Therefore, it does not happen that with respect to operations the condition of which for releasing forbiddance of selection status is set strictly in nature, by exchanging such operations easily between players, the condition for controlling the switch of the selection status of operation between permission and forbiddance is eased disorderly. By playing the communication mode, there is a possibility that it is permitted that the player self selects the operation the selection of which is forbidden. Therefore, a motivation for playing the communication mode can be given to players.

In the above mentioned game system 1, operations are distributed into the normal operation and the EX operation. With respect to the selection of EX operation, it is necessary that the EX operation is presented from the player of partner, or a lock release condition of the EX operation is satisfied by exchanging operations a few times. Namely, as long as a player does not play the communication mode, the player can't select the EX operation. Thereby, it is possible to make a player play the communication mode for the purpose that forbiddance of the selection status with respect to the EX operation is released. Accordingly, it is possible to give the player a strong motivation for playing the communication mode. It is also possible to give the player a strong motivation for playing the communication mode repeatedly, by setting the lock release condition of the EX operation in association with the exchange record of the operation, and further, setting the release condition so that at least one part of thereof is satisfied when the number of times operations were exchanged reaches a predetermined value.

In the above mentioned game system 1, the operation corresponds to a task. The operation management data 111 corresponds to a task management data. The exchange data 112*a*, 112*r* corresponds to information necessary for permitting the selection of a task as a present target. The exchange data 112*s* corresponds to information to be sent to a game apparatus of the player of partner. The exchange data 112*r* corresponds to information received from the game apparatus of the player of partner. The normal operations of the OP numbers 1 to 70 correspond to a first task group, and the EX operations of the OP numbers 71 to 90 correspond to a second task group. Then, the user storage area 10*a* of the internal storage apparatus of the control unit 10 functions as a storage device.

Further, the control unit 10 functions as a task management device by implementing steps S13 to S16 of FIG. 7 and steps S35 to S38 of FIG. 9, as a present target specifying device by implementing step S21 of FIG. 8, as an information sending device by implementing step S31 of FIG. 9, as an information receiving device by implementing step S32 of FIG. 9, and as a present task permission device by implementing steps S37 and S38 of FIG. 9. Further, the control unit 10 functions as a switch control device by implementing steps S13 to S16 of FIG. 7, and as a particular task permission device by implementing steps S35 to S38 of FIG. 9.

The present invention is not limited to the above mentioned embodiment, and can be applied to some variations as appropriate. For example, the data construction of task management data is not limited the one of operation management data 111, but may be set as appropriate as long as it can be distinguished whether the selection status of each operation is permitted or forbidden. With respect to all tasks prepared in a game, it is not necessary that the selection status can be switched between permission and forbiddance. The selection status can be set so as to be switched between permission and forbiddance with respect to only one part of the tasks. The task management device does not always control the switch between permission and forbiddance depending on the achievement state of tasks. The task management device, as long as including the present task permission device, may switch the selection status of task between permission and forbiddance depending on a predetermined condition. The player does not always specify one task as the present target, plural tasks may be specified at one time. The information necessary for permitting the selection is not limited to the data construction of exchange data 112*s*, 112*r* shown in FIG. 6. For example, the data construction may be configured in such a way that the comment information is omitted, and only information unique to the task of the specified target, like the OP number, is included. Alternatively, the following configuration may be applied: a release code for permitting the selection status of task is prepared separately from the OP number; the release codes are sent and received between the game apparatuses; and by using the release code received, the selection status of the task may be switched from forbiddance to permission.

In the above embodiment, in a case that the lock release condition of EX operation is satisfied, it is recognized that a particular condition is satisfied, and forbiddance of selection of EX operation is released in place of the task of a present target (a task presented). Alternatively, in addition to the permission to select a task of present target, the selection of EX operation may be permitted. The selection of EX operation is permitted either in a case that the EX operation is presented as the operation of present target from the player of partner, or in a case that the lock release condition of EX operation is satisfied. However, the following embodiment may be applied: it is forbidden to specify the EX operation as the present target; and only in a case that the lock release condition is satisfied, the selection of EX operation is permitted. Alternatively, the following embodiment may be applied: omitted is the control of switch of selection status between forbiddance and permission, the control depending on the lock release condition of the EX operation; only when the EX operation is presented from the player of partner, the selection of the EX operation is permitted. Further, separately from the above mentioned two conditions, a case that the selection of the EX operation is permitted may be set, or the EX operation itself may be omitted.

In the above embodiment, each time when the game is played in the communication mode, the operations are exchanged between the players. However, the condition for performing the exchange can be variable as appropriate as long as the condition is linked with a game-play of the communication mode. For example, only when the result of game of the communication mode is satisfied with a predetermined condition, the exchange of operations may be performed, or it may be determined at random whether or not the exchange of operations gets performed. Further, the information necessary for permitting the selection of a task is transmitted and received between the game apparatuses of the players of the communication mode. However, the following configuration may be applied: the information is transmitted from any one of the game apparatuses to the other one of the game apparatuses; and the information is not transmitted reversely. Namely, the transmission and receipt of the information necessary for permitting the selection of a task is not only performed bi-directionally, but also may be performed in only single direction. For example, in a case a battle game is played in the communication mode, the communication direction of the information may be controlled depending on win or loss in the communication mode in such a way that the information is sent in only a single direction from the game apparatus of a player as a loser to the game apparatus of a player as a winner. The information is not always transmitted and received at the end point of the communication mode. The information may be transmitted and received in the process of the communication mode, or at the start point the communication mode. Further, the game of communication mode may be a game which is executed between the game apparatuses of the 3 players or more. In this case, it is possible to set as appropriate the combination of players for performing the communication of the information necessary for permitting the selection of a task.

The present invention does not have to play a baseball game, and can be applied to a game system and a game apparatus where various kinds of games such as a music game and the like are provided. The communication mode does not have to be realized using a WAN like the internet. For example, the present invention can be also applied to a system where a game is progressed by communication between game apparatuses of the same store which are connected with each other through a LAN. Further, the present invention is applied not only to a system or a game apparatus which make a player play a game with a fee, but also to a game system or a game apparatus without a fee. The center server does not have to exist, and the present invention can be applied to a system where the game apparatuses perform the peer to peer communication to progress a game. The task may be any task to which some condition is given with respect to the achievement thereof, and it does not matter what the task is called, such as "mission", "operation", or the like.

What is claimed is:

1. A game system comprising a plurality of game apparatuses and provided with a communication mode enabling, by using communication among the plurality of game apparatuses, a player of each of the plurality of game apparatuses to play a predetermined game and a task mode enabling a player of each of the game apparatuses to select one of a plurality of tasks and play a game with an aim to achieve the task, each of the plurality of game apparatuses comprising a storage device, a display device, an input device, and a computer,
the storage device storing, with respect to each of the tasks, task management data where task information for identifying each task, status information for identifying an achievement status of the player, and forbiddance identification information for identifying whether a status of selection by the player is permission or forbiddance are correlated with each other, and
the computer being provided, by a computer program, with:
a task management device adapted and configured to change, when a predetermined condition is satisfied, the forbiddance identification information correlated with one of the tasks from the forbiddance to the permission in the task management data;
a present target specifying device adapted and configured to display the tasks the status information of each is set to an achieved status in the task management data to the player, and to allow the player to specify with the input device at least one task from the tasks displayed as a present target;
an information sending device adapted and configured to send to a game apparatus which is operated by an another player of the communication mode, the task information of the task specified as the present target in association with game-play of the communication mode, the game-play of the communication mode including the predetermined game that is different from the game being played in the task mode; and
an information receiving device adapted and configured to receive the task information sent from the game apparatus of the another player, wherein
the task management device is configured and adopted to include a present task permission device adapted and configured to, in a case that the information receiving device receives the task information, change in the task management information the forbiddance identification information of a task determined based on the task information to the permission.

2. The game system according to claim 1, wherein
the task management device has a switch control device adapted and configured to operate the task management data on a condition at least one part of which is that a player achieved one task, so that the status of selection by the player for another task changes from forbiddance to permission.

3. The game system according to claim 1, wherein
the plurality of tasks include tasks belonging to a first task group where the switch control device is capable of switching the status of selection from forbiddance to permission and tasks belonging to a second task group where the switch control device is not capable of switching the status of selection from forbiddance to permission, and
the present target specifying device is adapted and configured to allow the player to specify the task as the present target from the second task group.

4. The game system according to claim 1, wherein
the task management device further includes a particular task permission device adapted and configured to operate the task management data, so that permitted is the selection of a particular task different from the present task, in a case that the information receiving device receives the necessary information and a particular condition is satisfied.

5. The game system according to claim 4, wherein
the plurality of tasks include tasks belonging to a first task group where the switch control device is capable of switching the status of selection from forbiddance to permission and tasks belonging to a second task group where the switch control device is not capable of switching the status of selection from forbiddance to permission, and
the particular task permission device is adapted and configured to select the particular task from the second task group, and operate the task management data so that the selection by the player of the particular task is permitted.

6. The game system according to claim 4, wherein the particular condition is set in association with record of sending of the necessary information.

7. The game system according to claim 6, wherein the particular condition is set so that at least one part of the particular condition is permitted when the number of times of the sending achieves a predetermined number of times.

8. The game system according to claim 1, wherein the information sending device sends the necessary information to the game apparatus of the partner each time when the game-play of the game of communication mode ends.

9. A game apparatus being provided with a communication mode enabling a player to play a predetermined game using communication and a task mode enabling a player to select one of a plurality of tasks and play a game with an aim to achieve the task, the game apparatus comprising a storage device, a display device, an input device, and a computer, the storage device storing, with respect to each of the tasks, task management data where task information for identifying each task, status information for identifying an achievement status of the player, and forbiddance identification information for identifying whether a status of selection by the player is permission or forbiddance are correlated with each other, and the computer being provided, by a computer program, with:

a task management device adapted and configured to change, when a predetermined condition is satisfied, the forbiddance identification information correlated with one of the tasks from the forbiddance to the permission in the task management data;

a present target specifying device adapted and configured to display the tasks the status information of each is set to an achieved status in the task management data to the player, and to allow the player to specify with the input device at least one task from the tasks displayed as a present target;

an information sending device adapted and configured to send to a game apparatus which is operated by another player of the communication mode, the task information of the task specified as the present target in association with game-play of the communication mode, the game-play of the communication mode including the predetermined game that is different from the game being played in the task mode; and an information receiving device adapted and configured to receive the task information sent from the game apparatus of the another player, wherein the task management device is configured and adopted to include a present task permission device adapted and configured to, in a case that the information receiving device receives the task information, change in the task management information the forbiddance identification information of a task determined based on the task information to the permission.

10. A non-transitory computer readable storage medium storing a computer program of a game apparatus, the game apparatus being provided with a communication mode enabling a player to play a predetermined game using communication and a task mode enabling a player to select one of a plurality of tasks and play a game with an aim to achieve the task, and comprising a storage device which stores, with respect to each of the tasks, task management data where task information for identifying each task, status information for identifying an achievement status of the player, and forbiddance identification information for identifying whether a status of selection by the player is permission or forbiddance are correlated with each other, the computer program making a computer of the game apparatus function as:

a task management device adapted and configured to change, when a predetermined condition is satisfied, the forbiddance identification information correlated with one of the tasks from the forbiddance to the permission in the task management data;

a present target specifying device adapted and configured to display the tasks the status information of each is set to an achieved status in the task management data to the player, and to allow the player to specify with an input device at least one task from the tasks displayed as a present target;

an information sending device adapted and configured to send to a game apparatus which is operated by another player of the communication mode, the task information of the task specified as the present target in association with game-play of the communication mode, the game-play of the communication mode including the predetermined game that is different from the game being played in the task mode; and an information receiving device adapted and configured to receive the task information sent from the game apparatus of the another player, wherein the computer program makes the task management device as a present task permission device adapted and configured to, in a case that the information receiving device receives the task information, change in the task management information the forbiddance identification information of a task determined based on the task information to the permission.

* * * * *

UNITED STATES PATENT AND TRADEMARK OFFICE
CERTIFICATE OF CORRECTION

PATENT NO.       : 9,028,331 B2  
APPLICATION NO.  : 13/825092  
DATED            : May 12, 2015  
INVENTOR(S)      : Satoshi Uchiyama and Daisuke Chiba Page 1 of 1

It is certified that error appears in the above-identified patent and that said Letters Patent is hereby corrected as shown below:

In the claims,

Column 18, Line 10: Please delete the word "an".

Column 18, Line 20: Please delete the word "adopted" and replace with the word -- adapted --.

Column 19, Line 45: Please delete the word "adopted" and replace with the word -- adapted --.

Signed and Sealed this  
Third Day of November, 2015

Michelle K. Lee  
*Director of the United States Patent and Trademark Office*